(No Model.)
J. D. WATTERS.
FASTENING AND RELEASING DEVICE FOR CATTLE STALLS.
No. 264,805. Patented Sept. 19, 1882.
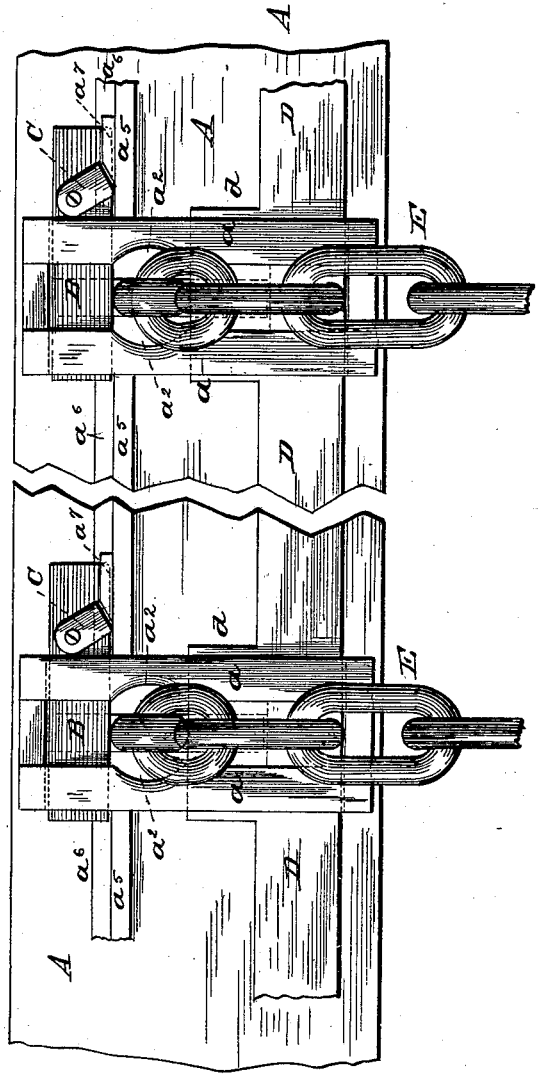
WITNESSES:
INVENTOR:
James D. Watters
BY
ATTORNEYS.

UNITED STATES PATENT OFFICE.

JAMES D. WATTERS, OF BELAIR, MARYLAND.

FASTENING AND RELEASING DEVICE FOR CATTLE-STALLS.

SPECIFICATION forming part of Letters Patent No. 264,805, dated September 19, 1882.

Application filed February 20, 1882. (No model.)

*To all whom it may concern:*

Be it known that I, JAMES D. WATTERS, of Belair, in the county of Harford and State of Maryland, have invented a new and useful Improvement in Fastening and Releasing Devices for Cattle-Stalls; and I do hereby declare that the following is a full, clear, and exact description of the same.

This invention relates to that class of devices which are adapted to permit the fastening and unfastening individually of any one animal, and also the releasing simultaneously of the entire number, when desired; and it consists mainly in the combination of a sliding locking-bar with a sliding releasing-bar and the cross-bar of a chain, as will be fully described hereinafter.

It consists, further, in the combination, with the sliding locking-bar, of a locking-block for fastening the sliding locking-bar.

In the drawings, Figure 1 represents a front view of my improved device with the securing-chains which pass about the necks of the cattle and fastened in place, and Fig. 2 a vertical sectional view of the same.

A represents a base-plate adapted to be attached to the front board of the feed-trough or to the wall of the stable above the manger, which is provided with the cross-plates $a\ a$, having a lower portion provided with vertical slots $a'\ a'$, Fig. 2; a central or nearly central portion having curved recesses $a^2\ a^2$, and an upper portion having vertical slots $a^3\ a^4$, as shown.

$a^5$ represents a horizontal extension upon one of the side plates, which is provided with the plates $a^6\ a^7$ for guiding the locking-bar in its movement.

B represents the locking-bar, adapted in size and shape to move through the slots $a^3\ a^4$ and upon the horizontal extension $a^5$, as shown, which is provided with a stop-block or projection, $b$, to limit its movement in one direction.

C represents a locking-block, the free end of which is adapted to bear against the end of plate $a^7$ for the purpose of securing the locking-bar against movement.

D represents a bar extending the entire length of the line of stalls, which is provided at proper intervals with a right-angled extension, $d$, adapted, when in its normal position, to lie in the slots of the single plates, as shown.

E represents a chain of proper length, to be secured about the neck of the animal to be fastened, which is provided at its loose end with the usual cross-bar, $e$, as shown.

The operation is substantially as follows: The locking-bar having been moved into its unlocked position, an animal having entered the stall with the chain upon its neck, one end of the cross-bar of the chain is thrust between the cross-plates down behind the releasing-bar. The sliding locking-bar is then moved into its locked position for the purpose of securing the other end of the cross-bar. The sliding locking-bar may then itself be fastened by turning down the locking-block C, as shown. Any individual animal may be readily released by reversing the action of the sliding locking-bar. The entire number, also, may be simultaneously released by sliding the bar D far enough to remove the extension $d$ from in front of the lower end of the cross-bar, when the latter, of course, will be free.

Having thus described my invention, what I claim, and desire to secure by Letters Patent, is—

1. The combination of a sliding locking-bar with a releasing-bar and the cross-bar $e$ of a chain, E, substantially as described.

2. In combination with the plate A, having the cross-plates $a\ a$, the locking-bar B and the releasing-bar D, as described.

3. In combination with the plate A, having the side plates, $a\ a$, the sliding locking-bar B, the releasing-bar D, and the locking-block C, as described.

JAMES D. WATTERS.

Witnesses:
JOHN BAUER,
RICHARD T. MARTIN.